(12) United States Patent
Heuer et al.

(10) Patent No.: US 11,757,631 B2
(45) Date of Patent: Sep. 12, 2023

(54) APPARATUS, SYSTEM, AND METHOD FOR RELEASING RECEIVED COMMAND DATA

(71) Applicant: Airbus Defence and Space GmbH, Taufkirchen (DE)

(72) Inventors: Thomas Heuer, Allershausen (DE); Riqaq Woolnough, Stolberg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 1122 days.

(21) Appl. No.: 16/279,674

(22) Filed: Feb. 19, 2019

(65) Prior Publication Data
US 2019/0258240 A1    Aug. 22, 2019

(30) Foreign Application Priority Data
Feb. 22, 2018   (DE) .......................... 102018104069.5

(51) Int. Cl.
*H04L 9/32*    (2006.01)
*H04L 9/08*    (2006.01)
(Continued)

(52) U.S. Cl.
CPC .......... *H04L 9/0861* (2013.01); *B64C 39/024* (2013.01); *H04L 9/32* (2013.01);
(Continued)

(58) Field of Classification Search
CPC combination set(s) only.
See application file for complete search history.

(56) References Cited

U.S. PATENT DOCUMENTS 9,826,415 B1 * 11/2017 Byrne .................... G08B 25/14
10,318,795 B2 * 6/2019 Hariri .................. G06V 40/166
(Continued)

FOREIGN PATENT DOCUMENTS

EP    2778598 A1 * 9/2014 .......... B64C 39/024
KR   101694115   * 1/2017
(Continued)

OTHER PUBLICATIONS

Rugo et al., A Security Review in the UAV Net Era: Threats, Countermeasures, and Gap Analysis, ACM Computing Surveys, vol. 55, No. 1, Article 21; Publication Date: Jan. 2022 (Year: 2022).*
(Continued)

*Primary Examiner* — Kari L Schmidt
*Assistant Examiner* — Paul J Skwierawski
(74) *Attorney, Agent, or Firm* — Greer, Burns & Crain, Ltd.

(57) ABSTRACT

An apparatus for releasing received command data includes a processor unit with a code generator, a cryptography module, and a comparison module. The code generator generates a transaction code. The apparatus has a transmitting unit which provides the transaction code via an unsecured data connection, a receiving unit which receives an external authentication code and command data via the unsecured data connection, and a memory unit which stores data of a predefined private key. Also disclosed is a transmission apparatus for command data. The transmission apparatus has a basic receiving unit which receives the transaction code, an input unit which receives the command data, a basic memory unit which stores the data of the predefined private key, a basic processor unit which has a basic cryptography module, and a basic transmitting unit
(Continued)

which provides the external authentication code and the command data via the unsecured data connection.

5 Claims, 4 Drawing Sheets

(51) Int. Cl.
    *H04L 9/40*         (2022.01)
    *B64C 39/02*       (2023.01)
    *H04W 12/069*    (2021.01)
    *H04W 12/106*    (2021.01)
    *H04W 12/108*    (2021.01)
    *G05D 1/00*       (2006.01)

(52) U.S. Cl.
    CPC ........ *H04L 63/0869* (2013.01); *H04L 63/123* (2013.01); *H04L 63/126* (2013.01); *H04W 12/069* (2021.01); *H04W 12/106* (2021.01); *H04W 12/108* (2021.01); *G05D 1/0022* (2013.01)

(56) References Cited

U.S. PATENT DOCUMENTS

| | | | | |
|---|---|---|---|---|
| 2009/0199292 A1* | 8/2009 | Sakamoto | .......... | G07C 9/00309 726/17 |
| 2010/0294583 A1* | 11/2010 | Biondo | .................. | A61B 5/082 340/576 |
| 2011/0074561 A1* | 3/2011 | Mackjust | ................. | B60R 25/10 340/5.72 |
| 2014/0277837 A1* | 9/2014 | Hatton | .................... | B60R 25/24 701/2 |
| 2016/0048692 A1* | 2/2016 | Fielder | .................. | H04L 63/123 713/185 |
| 2016/0147990 A1* | 5/2016 | Schneider | ............... | G06F 21/44 726/19 |
| 2016/0148450 A1* | 5/2016 | Ohshima | ............ | B62D 15/0285 340/5.61 |
| 2017/0092028 A1* | 3/2017 | Weicker | ............. | G07C 9/00309 |
| 2017/0232931 A1* | 8/2017 | Fernando | ............... | B60R 25/241 701/2 |
| 2017/0269611 A1* | 9/2017 | Rangarajan | .......... | G05D 1/0077 |
| 2018/0013815 A1* | 1/2018 | Gold | ....................... | H04L 63/00 |
| 2018/0270052 A1* | 9/2018 | Cullen | .................. | H04L 9/0827 |
| 2019/0287063 A1* | 9/2019 | Skaaksrud | ........... | G06Q 10/083 |

FOREIGN PATENT DOCUMENTS

| | | | | |
|---|---|---|---|---|
| WO | WO-2010111440 A2 * | 9/2010 | .......... | G06F 21/602 |
| WO | WO-2017017984 A1 * | 2/2017 | .......... | B64C 39/024 |

OTHER PUBLICATIONS

Manulis et al., Cyber Security in New Space: Analysis of threats, key enabling technologies and challenges, International Journal of Information Security (2021) 20:287-311, Published May 12, 2020 (Year: 2020).*

* cited by examiner

APPARATUS, SYSTEM, AND METHOD FOR RELEASING RECEIVED COMMAND DATA

CROSS-REFERENCE TO PRIORITY APPLICATION

This application claims the benefit of, and priority to, German patent application number DE 102018104069.5, filed Feb. 22, 2018. The content of the referenced application is incorporated by reference herein.

TECHNICAL FIELD

Embodiments of the subject matter described herein relate generally to an apparatus, a system, and a method for releasing received command data.

BACKGROUND

Remotely controlled means of transport, such as e.g. remotely controlled aircraft or vehicles are connected via two-way wireless command and control data connections to a remote control centre. The two-way wireless command and control data connection comprises an uplink connection and a downlink connection. Control commands and information are transmitted by the remote operator (e.g. the pilot) to the remotely controlled means of transport via the uplink connection from the remote control centre to the means of transport. Telemetry data, status information and situation information, for example, of the on-board systems of the means of transport are transmitted into the remote control centre via the downlink connection from the means of transport to the remote control centre. If the uplink connection fails, the remote operator can no longer control the remotely controlled means of transport.

In this case, it is essentially conceivable for an air traffic control unit to forward commands from a remote operator to the remotely controlled aircraft via an open data connection. However, the remotely controlled aircraft can be captured in this case by third parties with falsified commands via the open data connection. Furthermore, no consistency checking of the commands can be carried out in the remotely controlled aircraft. In the event of interference on the open data connection, this can result in the transmission of incorrect command data. In this case, the air traffic control unit will furthermore assume the role of the remote operator of the remotely controlled aircraft. The workload of the air traffic control unit is thereby increased, wherein the employees of the air traffic control unit normally have no training as remote operators. This increases the risk of accidents. A method of this type is therefore not currently supported by air traffic control due to legal and moral concerns.

BRIEF SUMMARY

The object of the disclosure is therefore to provide an apparatus, a system and a method which improve the safety of the remote control of means of transport.

The object is achieved by the features of the independent claims. Advantageous developments form the subject-matter of the dependent claims and the following description.

In an apparatus for releasing received command data, it is provided according to the disclosure that the apparatus comprises a receiving unit, a processor unit, a transmitting unit and a memory unit, wherein the processor unit has a code generator to generate a transaction code, a cryptography module to generate an authentication code and a comparison module to compare authentication codes, wherein the code generator generates a transaction code, wherein the transmitting unit provides the transaction code via an unsecured data connection, wherein the receiving unit receives an external authentication code and command data via the unsecured data connection, wherein data of a predefined private key are stored in the memory unit, wherein the cryptography module generates an internal authentication code based on the transaction code, the command data and the private key, and wherein the comparison module generates a release signal to release the command data if the external authentication code matches the internal authentication code.

In the event of a failure of an uplink connection to a remotely controlled means of transport, a command from a remote operator which has been transmitted via an unsecured data connection can be checked in the remotely controlled means of transport with the device for releasing received command data. A transaction code is first generated by the code generator and is made available by means of the transmitting unit via the unsecured data connection. The transaction code can be generated, for example, from telemetry data and/or position data and/or further environment parameters of the remotely controlled means of transport.

The transaction code can then be received by the remote operator. The remote operator then transmits an external authentication code and command data via the unsecured data connection to the receiving unit. The external authentication code can be generated from the command data, the transaction code and a private key. This private key is similarly stored in the memory unit of the apparatus for releasing received command data. The cryptography module generates an internal authentication code based on the transaction code, the command data and the stored private key. The algorithm which the cryptography module uses is the same as that used by the remote operator to generate the external authentication code. This means that, if the command data and the external authentication code have been transmitted correctly, the internal authentication code is identical to the external authentication code. The comparison between the internal authentication code and the external authentication code is provided by the comparison module. If the internal and external authentication codes match one another, the comparison module outputs a release signal. The command data are thus authenticated and released and can therefore be executed by the means of transport. An already existing open, i.e. unencrypted, data connection, for example, between the remote operator and the means of transport can thus be used to transmit commands between the remote operator and the means of transport in the event of a failure of the uplink connection. In the case where the means of transport is a remotely controlled aircraft, the need for an air traffic control unit to provide the capabilities for controlling a remotely controlled aircraft is thereby avoided. Furthermore, no valid commands can be transmitted to the remotely controlled means of transport without the consent of the remote operator. In addition, due to the linking of the authentication code with the command data, a command data checking facility is provided which detects transmission errors and therefore avoids the execution of incorrect commands by the remotely controlled means of transport.

The remotely controlled means of transport may, for example, be an aircraft, a vehicle, a spacecraft or a ship. The means of transport may also be an unmanned aircraft, an unmanned vehicle, an unmanned spacecraft or an unmanned ship.

In one exemplary embodiment, the transaction code can be based at least partially on the private key and preferably on at least one environment parameter. An environment parameter may, for example, be the position of the remotely controlled means of transport, its direction of movement and/or its speed.

According to the disclosure, a remotely controlled means of transport is furthermore provided, comprising an apparatus for releasing received command data according to the description given above and a control unit, wherein the control unit receives the command data and executes a command based on the command data if the control unit receives the release signal, and wherein the transmitting unit preferably transmits an acknowledgement signal if the external authentication code matches the internal authentication code.

The advantages and effects of the remotely controlled means of transport are similar to the advantages and effects of the apparatus for releasing received command data according to the description given above. Reference is therefore made in this respect to the description given above.

A transmission apparatus for command data is furthermore provided according to the disclosure, wherein the transmitting apparatus comprises a basic receiving unit, an input unit, a basic processor unit, a basic transmitting unit and a basic memory unit, wherein the basic processor unit has a basic cryptography module to generate an authentication code, wherein the basic receiving unit receives the transaction code via an unsecured data connection, wherein the input unit receives command data, wherein data of the predefined private key are stored in the basic unit, wherein the basic cryptography module generates an external authentication code based on the transaction code, the command data and the private key, and wherein the basic transmitting unit provides the external authentication code and the command data via the unsecured data connection.

The transmitting apparatus for command data comprises a basic receiving unit which is designed to receive a transaction code via an unsecured data connection. The reception of the transaction code indicates that a command can be transmitted via the unsecured data connection to a remotely controlled means of transport. An external authentication code is generated by means of the basic cryptography module on the basis of the transaction code, a private key which is stored in the memory unit and command data which can be input via the input unit, wherein the private key is also stored in the remotely controlled means of transport. The command data can be input, for example, by a remote operator via the input unit.

The external authentication code and the command data are then transmitted with the basic transmitting unit via the unsecured data connection to the remotely controlled means of transport. An internal authentication code which is compared with the external authentication code is generated in the remotely controlled means of transport by means of the command data, the transaction code generated and transmitted by the remotely controlled means of transport and the private key. The command which has been transmitted with the command data is executed only if the external and internal authentication codes match one another. An already existing open, i.e. unencrypted, data connection, for example, between the remote operator and the means of transport can thus be used to transmit commands between the remote operator and the means of transport in the event of a failure of the uplink connection. In the case where the means of transport is a remotely controlled aircraft, the need for an air traffic control unit to provide the capabilities for controlling a remotely controlled aircraft is thereby avoided. Furthermore, no valid commands can be transmitted to the remotely controlled means of transport without the consent of the remote operator. In addition, due to the linking of the authentication code with the command data, a command data checking facility is provided which detects transmission errors and therefore avoids the execution of incorrect commands by the remotely controlled means of transport.

The basic processor unit advantageously has a checking module, wherein the checking module checks the received transaction code, and wherein the checking module outputs an interrupt signal if the transaction code is not authentic.

The checking module prevents falsification of the received transaction code. Unauthorized data are thus prevented from providing a falsified transaction code in order to obtain the private key.

In one exemplary embodiment, the command data can have clear text.

The command data can therefore be easily checked. In one example, the command data can furthermore be transmitted by persons in an intermediate station. The remote operator can, for example, make a call via a telephone connection to an air traffic control centre in order to communicate the command data and the associated authentication code to an air traffic controller. The air traffic controller can then transmit the command data via an unsecured non-voice data connection to the remotely controlled means of transport.

It is furthermore advantageously provided that the transmission apparatus is a remote control apparatus for the remote control of a remotely controlled means of transport.

It is furthermore advantageous if the transmission apparatus has a display unit to display the external authentication code. In this example, a remote operator can take the external authentication code from the display unit and forward it by means of the transmitting unit, for example by telephone, to an air traffic controller. The air traffic controller can then transmit the external authentication code via an unsecured non-voice data connection to the remotely controlled means of transport.

A system for releasing received command data is furthermore provided according to the disclosure, wherein the system comprises an apparatus for releasing received command data according to the description given above or a means of transport according to the description given above, an unsecured data connection and a transmission apparatus for command data according to the description given above, wherein the apparatus for releasing received command data transmits a transaction code to the transmission apparatus via the unsecured data connection, and wherein the transmission apparatus transmits an external authentication code and command data to the apparatus for releasing received command data via the unsecured data connection.

The system for releasing received command data comprises the apparatus for releasing received command data and the transmission apparatus for command data according to the description given above. The advantages and effects of the system can therefore be found in the description given above. Reference is therefore made in this respect to the description given above.

In one exemplary embodiment, the unsecured data connection may be a non-voice data connection, i.e. a data connection which does not form a voice connection, which is preferably a Controller-Pilot Data Link Communication (CPDLC) or is preferably provided by an Aircraft Communications Addressing and Reporting System (ACARS).

In a further exemplary embodiment, the same private key is stored in the memory unit and in the basic memory unit.

It is advantageous if the system has an intermediate station for providing the unsecured data connection, wherein the intermediate station transmits a received transaction code to the transmission apparatus and transmits a received external authentication code and received command data to the apparatus for releasing received command data.

In this example, the system can make use of an existing infrastructure for transmitting data to remotely controlled means of transport. If the apparatus for releasing command data forms part of a remotely controlled means of transport, for example an aircraft, the air traffic control, for example, can be used as an intermediate station. The air traffic control has non-voice data connections for communicating with aircraft. The transaction code can be transmitted via these non-voice data connections from the remotely controlled aircraft to the remote operator who communicates with a transmission apparatus for command data. The transmission apparatus then receives the command data from the remote operator and calculates the authentication code for transmission to the apparatus for releasing command data which is disposed in the aircraft.

In one exemplary embodiment, the intermediate station may be an air traffic control unit in which an air traffic controller forwards the transaction code received via the unsecured data connection by telephone to the remote operator of an unmanned aircraft and, conversely, forwards command data received by telephone from the remote operator and the external authentication code via the non-voice data connection to the remotely controlled means of transport. The command data are preferably held in clear text and the authentication code in a human-readable format, such as a sequence of numbers and/or letters.

A method for releasing received command data is furthermore provided according to the disclosure, wherein the method comprises the following steps: a) generating a transaction code by means of a code generator; b) providing the transaction code via an unsecured data connection by means of a transmitting unit; c) receiving an external authentication code and command data via the unsecured data connection by means of a receiving unit; d) generating, by means of a cryptography module, an internal authentication code based on the transaction code, the command data and a private key stored in a memory unit; e) comparing the internal authentication code with the external authentication code by means of a comparison module; f) generating a release signal to release the command data if the external authentication code matches the internal authentication code.

A method for transmitting command data is furthermore provided according to the disclosure, wherein the method has the following steps: g) receiving a transaction code via an unsecured data connection by means of a basic receiving unit; h) receiving command data by means of an input unit; i) generating, by means of a basic cryptography module, an external authentication code based on the transaction code, the command data and a private key stored in a basic memory unit; j) providing the external authentication code and the command data via the unsecured data connection by means of a basic transmitting unit.

The advantages and effects of the method are similar to the advantages and effects of the apparatus described above. Reference is therefore made in this respect to the description given above.

Before step j), the method advantageously has the following step: k) outputting the external authentication code on a display unit.

A computer program element is furthermore provided according to the disclosure for controlling an apparatus for releasing received command data according to the description given above, a remotely controlled means of transport according to the description given above or a system according to the description given above, said computer program element carrying out the method steps of the method for releasing received command data according to the description given above when the computer program element is executed on a processor unit.

A computer program element is furthermore provided for controlling an apparatus for transmitting command data according to the description given above or a system according to the description given above, said computer program element carrying out the method steps of the method for transmitting command data according to the description given above when the computer program element is executed on a processor unit.

A computer-readable medium on which one or both computer program elements is/are stored is furthermore provided according to the disclosure.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the invention are described below on the basis of an exemplary embodiment by means of the attached drawing. In the drawing.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
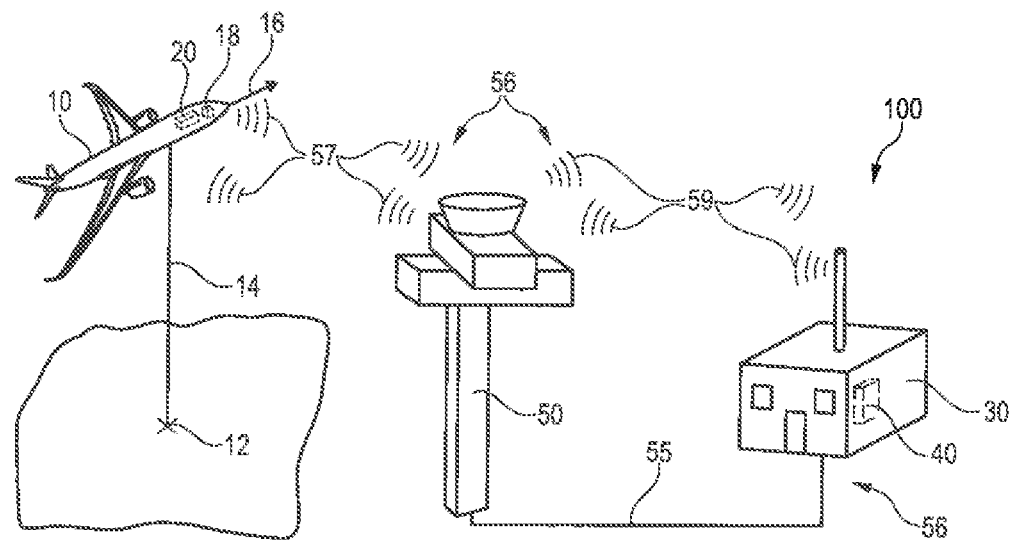
FIG. 1 shows a schematic view of a means of transport remotely controlled by a remote operator via an intermediate station.

FIG. 1 shows a remotely controlled means of transport 10 in the form of an aircraft, a remote control station 30 and an intermediate station 50 in the form of a tower of an air traffic control centre.

The means of transport 10 has sensors (not shown) e.g. in order to determine the position 12, the distance from the ground 14 and the flight direction 16. The means of transport 10 furthermore has a control unit 18 which controls the aircraft 10, and also an apparatus 20 for releasing command data. The aircraft 10 is connected to the intermediate station 50 via an unsecured data connection 56 in the form of a radio link 57.

The intermediate station 50 can communicate with the remote control station 30 via a further radio link 59. Alternatively or additionally, the intermediate station 50 can be connected to the remote control station 30 via a cable connection 55. The radio link 57 and the further radio link 59 or the cable connection 55 form the unsecured data connection 56.

The remote control station 30 has a transmission apparatus 40 for transmitting command data. A remote operator can transmit commands to the remotely controlled means of transport 10 by means of the transmission apparatus 40 if a direct uplink connection between the means of transport 10 and the remote control station 30 is interrupted.

Figure 2:
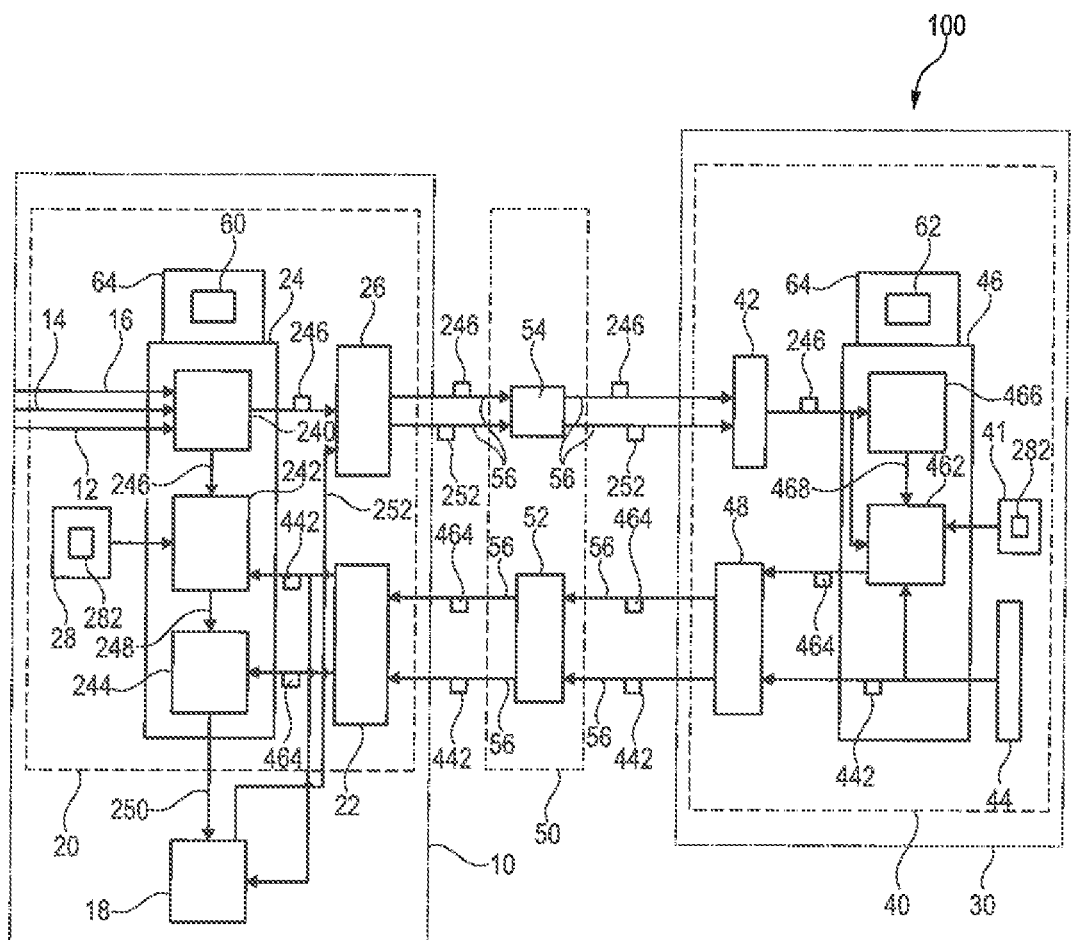
FIG. 2 shows a schematic view of the system.

FIG. 2 shows a schematic view of the system 100 for releasing command data. The system 100 has the apparatus 20 and the transmission apparatus 40. The apparatus 20 can be disposed in the remotely controlled means of transport 10 which has a control unit 18 which is designed to control the means of transport 10. The transmission apparatus 40 can furthermore be disposed in the remote control station 30.

The apparatus 20 for releasing command data comprises a receiving unit 22, a processor unit 24, a transmitting unit 26 and a memory unit 28 in which a private key 282 is stored. The processor unit 24 furthermore has a code generator 240, a cryptography module 242 and a comparison module 244.

The code generator 240 is designed to generate a transaction code 246.

The cryptography module 242 is designed to generate an authentication code 248 based on command data 442, the transaction code 246 and the private key 282.

The comparison module 244 is furthermore designed to generate a release signal 250 if a comparison of two authentication codes produces a match.

The transmission apparatus 40 comprises a basic receiving unit 42, an input unit 44, a basic processor unit 46, a basic transmitting unit 48 and a basic memory unit 41 in which the private key 282 is stored. The basic processor unit 46 comprises a basic cryptography module 462 and a checking module 466.

The basic cryptography module 462 is designed to generate an authentication code on the basis of command data 442, a transaction code 246 and a private key 282.

If a direct encrypted or secured control connection between the apparatus 20 or the remotely controlled means of transport 10 and a remote operator in a remote control station 30 is interrupted, the code generator 240 generates a transaction code 246.

To do this, the code generator 240 can integrate information relating to the position 12, the distance 14 from the ground and/or the direction of movement and speed 16 of the remotely controlled means of transport 10 into the transaction code 246. Parts of the private key 282 can furthermore be incorporated into the transaction code 246.

The transaction code 246 is transmitted to the transmitting unit 26 which provides the transaction code 246 via an unsecured data connection 56.

In one exemplary embodiment, the transaction code 246 can be transmitted to an intermediate station 50. The intermediate station 50 can have a transceiver unit 54 which receives the transaction code 246 and similarly forwards it automatically via an unsecured data connection 56 to the basic receiving unit 42 of the transmission apparatus 40 in the remote control station 30. In one alternative exemplary embodiment, an air traffic controller can receive the transaction code 246 from the transceiver unit 54 and transmit it to the remote control station 30. In a further alternative exemplary embodiment, the transaction code 246 can be transmitted directly from the transmitting unit 26 to the basic receiving unit 42.

The authenticity of the transaction code 246 is then first checked by the checking module 466. The checking module 466 can carry out a plausibility check and, if the transaction code 246 has elements of the private key 282, can carry out a check to determine whether these elements match the private key 282 stored in the basic memory unit 41. The plausibility check can be carried out, for example, on the basis of the last-known position 12, the distance 14 from the ground, the direction of movement and/or the speed 16.

If the transaction code 246 is classified by the checking module 466 as not authentic, the checking module 466 transmits an interrupt signal 468. The transaction code 246 is therefore not used and the procedure is interrupted. A new transaction code 246 can then be requested.

If the transaction code 246 is classified by the checking module 466 as authentic, the transaction code 246 can be used by the basic cryptography module 462 to generate an external authentication code 464. An external authentication code 464 is generated if command data 442 are input via the input unit 44. The basic cryptography module 462 generates the external authentication code 464 on the basis of the transaction code 246, the command data 442 and the private key 282. Cryptographic algorithms are used here.

The external authentication code 464 and the command data 442 are provided by means of the basic transmitting unit 48 via the unsecured data connection 56.

In one exemplary embodiment, the external authentication code 464 and the command data 442 can be transmitted to the intermediate station 50. The intermediate station 50 can have a transceiver unit 52 which receives the external authentication code 464 and the command data 442 and similarly forwards them automatically via an unsecured data connection 56 to the receiving unit 22 of the apparatus 20 in the remotely controlled means of transport 10. In one alternative exemplary embodiment, an air traffic controller can receive the external authentication code 464 and the command data 442 from the transceiver unit 52 and transmit them via an unsecured non-voice data connection 56. In a further alternative exemplary embodiment, the external authentication code 464 and the command data 442 can be transmitted directly from the basic transmitting unit 48 to the receiving unit 22.

The command data 442 are used by the cryptography module 242 of the apparatus 20 to generate an internal authentication code 248. The cryptography module 242 generates the internal authentication code 248 on the basis of the private key 282, the transaction code 246 and the command data 442. The cryptography module 242 uses the same cryptographic algorithms as the basic cryptography module 462.

The comparison module 244 compares the generated internal authentication code 248 with the external authentication code 464. If the comparison produces a match, the comparison module 244 outputs a release signal 250.

The control unit 18 is designed to receive the release signal 250 and the command data 442. The control unit 18 executes the commands which are transmitted with the command data 442 if it receives the release signal 250 for the command data 442. The control unit 18 can furthermore output an acknowledgement signal 252 to acknowledge the execution of the commands. The acknowledgement signal 252 can be provided by means of the transmitting unit 26 via the unsecured data connection 56.

Since the cryptography module 242 and the basic cryptography module 462 use the same private key 282 and the same cryptographic algorithms to create authentication codes, the correctness and the source of the transmitted command data 442 can be checked. If the internal authentication code 248 does not match the external authentication code 464, an error in the transmission of the command data 442 and/or an error in the transmission of the transaction code 246 may be present. The command data 442 or the transaction code 264 can furthermore be falsified and could therefore originate from unauthorized third parties. The execution by the control unit 18 of incorrect command data or command data from an unauthorized source can be avoided through the comparison of the external with the internal authentication code.

Figure 3:
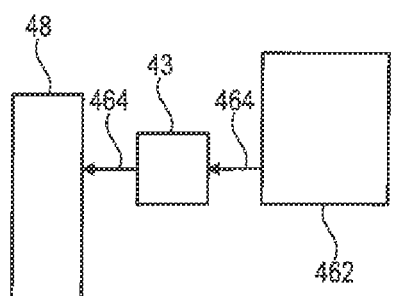
FIG. 3 shows a schematic partial view of a further exemplary embodiment of the system.

FIG. 3 shows a part of an alternative exemplary embodiment of the transmission apparatus 40. The basic cryptography module 462, a display unit 43 and the basic transmitting unit 48 are shown. The display unit 43 is interposed between the basic cryptography module 462 and the basic transmitting unit 48. The external authentication code 464 is transmitted to the display unit 43 and is displayed by the latter. In this exemplary embodiment, a remote operator can take the authentication code 464 from the display unit 43 and transmit it by means of the transmitting unit 48, for example by telephone, to an air traffic controller in an intermediate station 50 via an unsecured data connection 56 which can transmit data and/or voice.

Figure 4A:
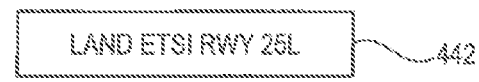
FIGS. 4a-c show a schematic view of command data (a), a transaction code (b) and an authentication code (c)
Figure 4B:
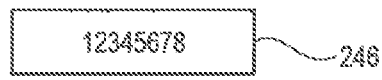
Figure 4C:
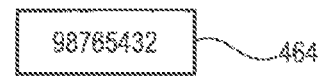

FIGS. 4a-c show examples of command data 442, a transaction code 246 and an authentication code 464.

FIG. 4a shows command data 442. The command data 442 may have clear text. In this example, the command data 442 comprise the command to land on a runway.

FIG. 4b shows an example of a transaction code 246. In this example, the transaction code 246 comprises a character sequence in which, for example, the position data 12 of the remotely controlled means of transport 10 and a part of the private key 282 can be encrypted.

FIG. 4c shows an example of an authentication code. This may be the external authentication code 464 or the internal authentication code 248. The authentication code can also be shown as a character sequence.

Figure 5A:
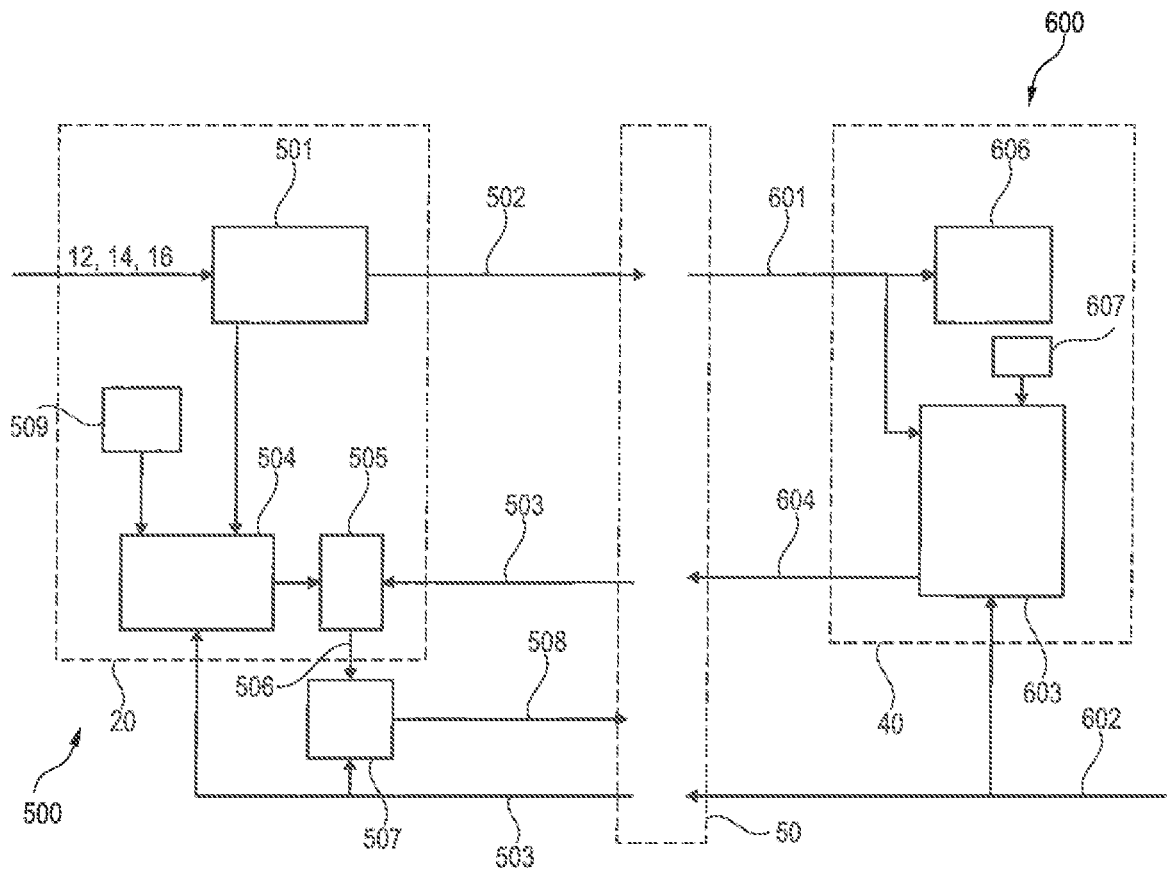
FIGS. 5a-b show schematic views of different exemplary embodiments of the method.
Figure 6:
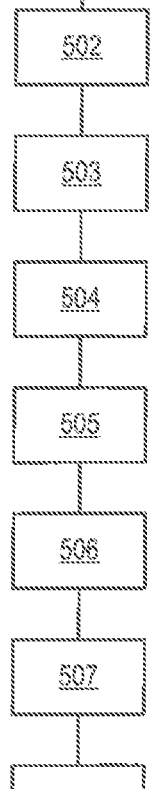
FIG. 6 shows a flow diagram of the method for releasing received command data.

FIG. 5a shows, in the left-hand area, the method 500 for releasing received command data. The method 500 is furthermore shown in FIG. 6 and can be executed by a computer program element 60 which can be stored on a computer-readable medium 64.

The method 500 comprises the step a), generating 501 a transaction code by means of a code generator. The transaction code can be based on position data 12, a distance 14 from the ground and/or a direction of movement or speed 16.

In a step b), the transaction code is provided 502 by means of a transmitting unit via an unsecured data connection. The unsecured data connection may be an unsecured radio communication network of an air traffic control centre if the method is carried out on an aircraft.

In a further step c), an external authentication code and command data are received 503 by means of a receiving unit. The external authentication code and the command data are received 503 only after the transaction code has been provided 502.

In a step d), an internal authentication code based on the transaction code, the command data and a private key stored in a memory unit can be generated 504 by means of a cryptography module. The external authentication code which has been received by the receiving unit has similarly been generated by means of the private key, the command data and the transaction code. However, since the transaction code, the command data and the external authentication code are transmitted via the unsecured data connection, transmission errors can occur or unauthorized sources can provide the command data and the external authentication code.

In a step e), the internal authentication code is therefore compared 505 with the external authentication code by means of a comparison module.

If the internal and external authentication codes match one another, a release signal for releasing the command data is generated 506 by means of the comparison module. The release signal thus indicates that the command data originate from an authorized source and have been transmitted without falsification.

The release signal is transmitted to a control unit which also receives the command data. The control unit then executes 507 the commands which have been transmitted with the command data. The control unit can furthermore output 508 an acknowledgement signal to acknowledge the execution 507 of the commands. The acknowledgement signal can be provided by means of the transmitting unit via the unsecured data connection.

Figure 7:
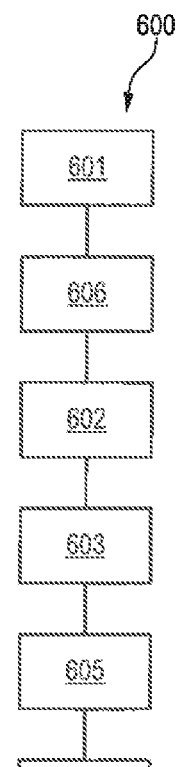
FIG. 7 shows a flow diagram of the method for transmitting command data.

The right-hand part of FIG. 5a shows the method 600 for transmitting command data which is similarly described in FIG. 7 and can be executed by a computer program element 62 which can be stored 509 on a computer-readable medium 64.

In a step g), the transaction code is received 601 by means of a basic receiving unit via the unsecured data connection. The transaction code may have been previously generated by step a) of the method 500.

After step g), the plausibility and authenticity of the transaction code can be checked 606 by means of a checking module.

In a step h), command data can be received 602 by means of an input unit. A remote operator, for example, of a remotely controlled aircraft can input the command data into the input unit.

In a step i), an external authentication code based on the transaction code, the command data and a private key stored 607 in a basic memory unit can be generated 603 by means of a basic cryptography module. The external authentication code is generated in the same way as the internal authentication code is generated in step d) of the method 500.

In a step j), the external authentication code and the command data are provided 604 by means of a basic transmitting unit via an unsecured data connection. Step c) of the method 500 can follow step j).

Figure 5B:
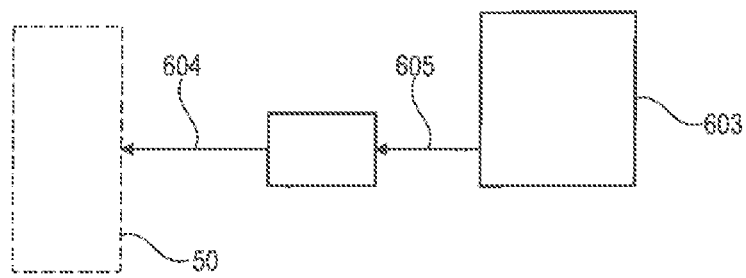

FIG. 5b shows a part of an alternative exemplary embodiment of the method 600. In a step k), the external authentication code is output 605 on a display unit. The output of the external authentication code can serve in such a way that a remote operator reads off the external authentication code and communicates it verbally via a basic transmitting unit to an employee in an intermediate station. The external authentication code is transmitted from the intermediate station via a non-voice connection to the remotely controlled means of transport.

Figure 8:
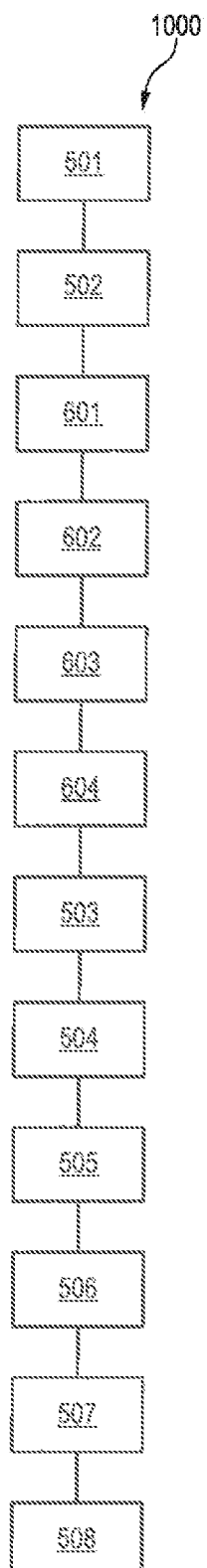
FIG. 8 shows a flow diagram of the combination of the method for releasing received command data and the method for transmitting command data.

FIG. 8 shows an exemplary combination of the methods 500 and 600 as a combined method 1000. Steps g), h), i) and j) first follow steps a) and b). Steps c), d), e), and f) then follow.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for securely releasing received command data within an unmanned remote-controlled means of transport which is operated via a remote-control station, the method comprising the steps of:
    generating a transaction code useable for security confirmation, by means of a code generator within the remote-controlled means of transport;
    transmitting the transaction code from the remote-controlled means of transport to the remote-control station, via an at least one unsecured data connection;
    receiving an external authentication code and command data from the remote-control station at the remote-controlled means of transport, via the at least one unsecured data connection;
    generating an internal authentication code within the remote-controlled means of transport, based on a combination of the transaction code, the command data and a private key stored in a memory;
    comparing the internal authentication code with the external authentication code for security confirmation, within the remote-controlled means of transport;
    generating a release signal within the remote-controlled means of transport, to release the command data when the external authentication code matches the internal authentication code for security confirmation; and
    transmitting an electronic acknowledgement signal from the remote-controlled means of transport back to the remote-control station, when the external authentication code matches the internal authentication code,
    wherein the transaction code is based, at least partially, on the private key and at least one environmental parameter, wherein the at least one environmental factor comprises a position of a remote-controlled means of transport, a direction of movement of a remote-controlled means of transport, a speed of movement of a remote-controlled means of transport, or a combination thereof,
    and wherein the remote-controlled means of transport is one of a: remote-controlled aircraft; remote-controlled spacecraft; remote-controlled ship; and a remote-controlled vehicle.

2. A method for securely transmitting command data to remotely control an unmanned remote-controlled means of transport which is operated via a remote-control station, the method comprising the steps of:
    receiving a transaction code useable for security confirmation, from the remote-controlled means of transport, at the remote-control station via an at least one unsecured data connection;
    receiving command data;
    generating an external authentication code within the remote-control station, based on a combination of the transaction code, the command data and a private key stored in a memory;
    transmitting the external authentication code and the command data from the remote-control station to the remote-controlled means of transport, via the at least one unsecured data connection;
    generating an internal authentication code within the remote-controlled means of transport, based on a combination of the transaction code, the command data and a private key stored in a memory;
    comparing the internal authentication code with the external authentication code for security confirmation, within the remote-controlled means of transport;
    generating a release signal within the remote-controlled means of transport, to release the command data when the external authentication code matches the internal authentication code for security confirmation; and
    receiving an electronic acknowledgement signal from the remote-controlled means of transport at the remote-control station, when the external authentication code matches the internal authentication code,
    wherein the transaction code is based, at least partially, on the private key and at least one environmental parameter associated with the remote-controlled means of transport; and
    wherein the remote-controlled means of transport is one of a: remote-controlled aircraft; remote-controlled spacecraft; remote-controlled ship; and a remote-controlled vehicle.

3. The method according to claim 2, wherein, before the transmitting step, the method further comprises:
    displaying the external authentication code on a display.

4. The method according to claim 2, wherein the at least one environmental factor comprises a position of the remote-controlled means of transport, a direction of movement of the remote-controlled means of transport, a speed of movement of the remote-controlled means of transport, or a combination thereof.

5. The method according to claim 2, further comprising:
    checking a received transaction code to determine if the received transaction code is authentic or not authentic; and
    outputting an interrupt signal when the received transaction code has been determined to be not authentic.

* * * * *